(12) United States Patent
Liu et al.

(10) Patent No.: US 10,203,454 B2
(45) Date of Patent: Feb. 12, 2019

(54) DENSE WAVELENGTH-DIVISION MULTIPLEXING (DWDM) NETWORK AND METHOD

(71) Applicant: Futurewei Technologies, Inc., Plano, TX (US)

(72) Inventors: Tiangong Liu, San Jose, CA (US); Xiao Andy Shen, San Bruno, CA (US); Qianfan Xu, San Jose, CA (US); Feng Zhang, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/610,366

(22) Filed: May 31, 2017

(65) Prior Publication Data

US 2017/0346592 A1  Nov. 30, 2017

Related U.S. Application Data

(60) Provisional application No. 62/343,678, filed on May 31, 2016.

(51) Int. Cl.
*H04J 14/02* (2006.01)
*G02B 6/28* (2006.01)
(Continued)

(52) U.S. Cl.
CPC ............ *G02B 6/28* (2013.01); *G02B 6/0026* (2013.01); *G02B 6/2938* (2013.01); *G02B 6/32* (2013.01);
(Continued)

(58) Field of Classification Search
CPC .... H04J 14/02; H04J 14/0265; H04J 14/0201; H04J 14/0221; H04B 10/505;
(Continued)

(56) References Cited

U.S. PATENT DOCUMENTS 6,222,654 B1 * 4/2001 Frigo ................. H04J 14/0201
398/83
6,282,005 B1  8/2001 Thompson et al.
(Continued)

FOREIGN PATENT DOCUMENTS

| EP | 2763341 A1 | 8/2014 |
|---|---|---|
| WO | 1039670 A2 | 9/2000 |
| WO | 03049346 A1 | 6/2003 |

OTHER PUBLICATIONS

Ken-Ichi Suzuki,"Burst-mode Optical Amplifiers for Passive Optical Networks",InTech,dated 2011,total 19 pages.
(Continued)

*Primary Examiner* — Hanh Phan
(74) *Attorney, Agent, or Firm* — Daniel J. Burns

(57) ABSTRACT

A dense wavelength-division multiplexing (DWDM) optical network includes an optical input port configured to receive unmodulated optical signals from the optical fiber comprising wavelength channels; one or more modulators coupled to the optical input port wherein the one or more modulators are each configured to modulate a respective first wavelength channel of the wavelength channels with respective data to produce a modulated first wavelength channel when the modulator is in a transmit state; wherein an input optical power of each modulator is kept at substantially a first level and an output optical power of the each modulator is kept at substantially a second level during operation of the modulator. A method and an optical network node are also disclosed therein.

31 Claims, 16 Drawing Sheets

(51) Int. Cl.
  *G02B 6/293* (2006.01)
  *G02B 6/32* (2006.01)
  *G02B 6/42* (2006.01)
  *F21V 8/00* (2006.01)

(52) U.S. Cl.
  CPC .......... *G02B 6/4249* (2013.01); *H04J 14/028* (2013.01); *H04J 14/0256* (2013.01); *H04J 14/0265* (2013.01)

(58) Field of Classification Search
  CPC .... H04B 10/5053; H04B 10/506; G02B 6/28; G02B 6/2938
  USPC ..... 398/183, 186, 188, 79, 59, 83, 158, 159, 398/160, 33, 38
  See application file for complete search history.

(56) References Cited

U.S. PATENT DOCUMENTS

| | | |
|---|---|---|
| 6,782,204 B1 | 8/2004 | Thomas et al. |
| 6,788,899 B2 | 9/2004 | Way |
| 7,251,386 B1 | 7/2007 | Dickinson et al. |
| 7,660,326 B2 | 2/2010 | Shachar et al. |
| 8,798,468 B1 * | 8/2014 | Sindhu ............... H04Q 11/0071 372/29.01 |
| 9,130,691 B2 | 9/2015 | Xia et al. |
| 9,348,154 B2 | 5/2016 | Hayakawa |
| 2003/0138254 A1 * | 7/2003 | Otsuka ............... H04J 14/0206 398/85 |
| 2004/0234273 A1 | 11/2004 | Sayyah et al. |
| 2006/0140642 A1 | 6/2006 | Brolin |
| 2006/0216026 A1 | 9/2006 | Izumi |
| 2007/0292143 A1 | 12/2007 | Yu et al. |
| 2010/0098420 A1 | 4/2010 | Ibragimov et al. |
| 2010/0166423 A1 | 7/2010 | Chang et al. |
| 2010/0226657 A1 | 9/2010 | Raymond et al. |
| 2011/0097086 A1 | 4/2011 | Binkert et al. |
| 2011/0206377 A1 | 8/2011 | Binkert et al. |
| 2014/0205286 A1 | 7/2014 | Ji et al. |
| 2015/0163570 A1 | 6/2015 | Zid et al. |
| 2016/0006507 A1 | 1/2016 | Campos |

OTHER PUBLICATIONS

Qin Ting et al., "Communication Professional Practice (Intermediate) Transmission and Access Professional Examination Guidance-Chap03-DWDM-technology",Tsinghua University Press,dated 2014,p. 94-121.

Dense-Wavelength-Division-Multiplexing-(DWDM) chap04_part-3,The International Engineering Consortium,retrieved from Internet on Jun. 6, 2018,http://www.ee.columbia.edu/~bbathula/courses/HPCN/chap04_part-3.pdf,total 15 pages.

Qianfan Xu et al., "Cascaded silicon micro-ring modulators for WDM optical interconnection", Optics Express, vol. 14, No. 20,dated Oct. 2, 2006,total 6 pages.

* cited by examiner $$P2a/b = P_{1a} + P_{1b} \pm 2\sqrt{P_{1a}P_{1b}}\cos(\theta + \varphi)$$

$$P3a \sim 0 \text{ if modulation off}$$

DENSE WAVELENGTH-DIVISION MULTIPLEXING (DWDM) NETWORK AND METHOD

CROSS-REFERENCE TO RELATED APPLICATIONS

This patent application claims priority to U.S. Provisional Application No. 62/343,678, filed on May 31, 2016 and entitled "Ring Network with Centralized Dense Wavelength-Division Multiplexing (DWDM) Laser Source" which is hereby incorporated by reference herein as if reproduced in its entirety.

BACKGROUND

In fiber-optic communications, wavelength-division multiplexing (WDM) is a technology which multiplexes a number of optical carrier signals onto a single optical fiber by using different wavelengths (i.e., colors) of laser light. Intuitively, a wavelength can be thought of as a particular "color". Many colors can carry signals for communication and be bundled together and passed down a single fiber, then separated into a receiver to receive the carried signals. This technique can be used for bidirectional communications over one strand of fiber, as well as multiplication of capacity.

Conventional DWDM optical systems applies to mainly static traffic by provisioning the traffic in advance through rigorous optical power management and control. These systems may not be capable of handling dynamic traffic control such as burst mode traffic due to many reasons, among which are the unpredictable optical power at each optical amplifiers resulting in transit noise optical amplifier, large variation of the received optical power and clock phase as well as slow switching time from one wavelength to others, making the dynamic DWDM network may not be feasible in practice. For example, traditional optical burst mode networks may suffer from unpredictable optical at optical amplifiers, resulting transit noise from OA; or a receiver may see burst traffic from different nodes at different time with no signal between bursts, leading to large variation of the signal and clock from burst to burst as well as the needs for long pre-amble; or a slow switching from one wavelength to others may happen in burst mode.

Conventional dense wavelength-division multiplexing (DWDM) optical systems include stacks of optical line-cards and an optical multiplexer (MUX)-demultiplexer (DE-MUX)-card. The optical line-cards transmit and receive high-speed modulated DWDM optical signals. The optical MUX-DEMUX card multiplexes all DWDM wavelengths at transmitter side and demultiplexes the DWDM wavelengths at receive side.

SUMMARY

An example embodiment includes an optical network node connected in sequence to an optical fiber of an optical network for dense wavelength-division multiplexing (DWDM) communication, the optical network node comprising: an optical input port configured to receive unmodulated optical signals from the optical fiber comprising wavelength channels; one or more modulators coupled to the optical input port wherein the one or more modulators are each configured to modulate a respective first wavelength channel of the wavelength channels with respective data to produce a modulated first wavelength channel when the modulator is in a transmit state; one or more receivers coupled to the optical input port through an optical power splitter wherein each receiver is configured to receive a respective portion of optical power of one of the respective first wavelength channels of the wavelength channels; and an optical output port configured to transmit a combination of the one or more of the modulated first wavelength channels with a subset of the wavelength channels on the optical fiber; wherein an input optical power of each modulator is kept at substantially a first level and an output optical power of the each modulator may also be kept at substantially a second level during operation of the modulator.

Optionally, in any of the preceding embodiments, the optical network node wherein the optical network node comprises one or more transmitters coupled to the optical output port, and an input optical power of each of the transmitters is kept at substantially a first level and an output optical power of the transmitter is kept at substantially a second level during operation of the transmitter.

Optionally, in any of the preceding embodiments, the optical network node wherein each modulator of the one or more modulators has a transmitting state and a bypassing state.

Optionally, in any of the preceding embodiments, the optical network node wherein the input optical power of each modulator is kept at the substantially the first level and the output optical power of the each modulator is kept at substantially the second level during operation of the modulator by tuning an optical amplifier gain to fully compensate link loss of the DWDM communication.

Optionally, in any of the preceding embodiments, the optical network node wherein the modulators are configured such that only one modulator can be in a transmit state at any given time and the other modulators are in a bypass state at the given time whereby the other modulators do not modulate their respective first wavelength channels.

Optionally, in any of the preceding embodiments, the optical network node wherein the optical network node is further configured to control a clock recovery unit (CDR) voltage controlled oscillator (VCO) provision to align a data-clock phase of a common clock that the optical network node receives from another optical network node.

Optionally, in any of the preceding embodiments, the optical network node wherein the optical network node further comprises one or more transmitters, pairing a transmitter of the one or more transmitters and a receiver of the one or more receivers for handling the one of the respective first wavelength channels, and a transmitting and receiving pair skew measurement for each of the first respective wavelengths is measured by sending a round-trip low frequency dither between the transmitting and receiving pair.

Optionally, in any of the preceding embodiments, wherein the optical network node further configured to receive a common clock in a burst mode.

Optionally, in any of the preceding embodiments, the optical network node wherein the burst mode is configured to work on a transmitter data phase and a clock recovery reference clock of the receiver.

Another embodiment includes a method for operating an optical network for dense wavelength-division multiplexing (DWDM) communication, the method comprising: receiving unmodulated optical signals from an optical fiber comprising wavelength channels; modulating a respective first wavelength channel of the wavelength channels with respective data to produce a modulated first wavelength channel wherein the modulating is carried out by a modulator and the modulator is in a transmit state; and transmitting a combination of the modulated first wavelength channel with a subset of the wavelength channels on the optical fiber; wherein an input optical power of each modulator is kept at substantially a first level and an output optical power of the each modulator may also be kept at substantially a second level during operation of the modulator.

Optionally, in any of the preceding embodiments, the method wherein the input optical power before the modulating is kept at substantially the first level and the output optical power after the transmitting is kept at substantially the second level by tuning an optical amplifier gain to fully compensate link loss of the DWDM communication.

Optionally, in any of the preceding embodiments, the method wherein a first optical network node is connected in sequence to the optical fiber with one or more other optical network nodes in the optical network, wherein a plurality of modulators are configured to carry out the modulating, wherein the plurality of modulators are configured such that only one modulator can be in a transmit state at any given time and the other modulators are in a bypass state at the given time whereby the other modulators do not modulate their respective first wavelength channels.

Optionally, in any of the preceding embodiments, the method further comprises controlling a CDR VCO provision to align a data-clock phase of a received common clock.

Optionally, in any of the preceding embodiments, the method further comprises measuring a transmitting and receiving pair skew measurement for the one or more respective first wavelength channels by sending a round-trip low frequency dither between the transmitting and receiving pair.

Optionally, in any of the preceding embodiments, wherein the optical network node further configured to receive a common clock in a burst mode.

Optionally, in any of the preceding embodiments, the optical network node wherein the burst mode is configured to work on a transmitter data phase and a clock recovery reference clock of the receiver.

Another embodiment includes an optical network node connected in sequence to an optical fiber of an optical network for dense wavelength-division multiplexing (DWDM) communication, comprising: a memory storing instructions; and a processor coupled to the memory, with the processor reading and executing the instructions to: receive unmodulated optical signals from an optical fiber comprising wavelength channels; modulate a respective first wavelength channel of the wavelength channels with respective data to produce a modulated first wavelength channel wherein the modulating is carried out by a modulator and the modulator is in a transmit state; and transmit a combination of the modulated first wavelength channel with a subset of the wavelength channels on the optical fiber; wherein an input optical power of each modulator is kept at substantially a first level and an output optical power of the each modulator may also be kept at substantially a second level during operation of the modulator.

Optionally, in any of the preceding embodiments, the optical network node wherein the input optical power before the modulating is kept at substantially the first level and the output optical power after the transmitting is kept at substantially the second level by tuning an optical amplifier gain to fully compensate link loss of the DWDM communication.

Optionally, in any of the preceding embodiments, the optical network node wherein a first optical network node is connected in sequence to the optical fiber with one or more other optical network nodes in the optical network, wherein a plurality of modulators are configured to carry out the modulating, wherein the plurality of modulators are configured such that only one modulator can be in a transmit state at any given time and the other modulators are in a bypass state at the given time whereby the other modulators do not modulate their respective first wavelength channels.

Optionally, in any of the preceding embodiments, the optical network node wherein the processor is further configured to: measure a transmitting and receiving pair skew measurement for the one or more respective first wavelength channels by sending a round-trip low frequency dither between the transmitting and receiving pair.

Optionally, in any of the preceding embodiments, wherein the optical network node further configured to receive a common clock in a burst mode.

Optionally, in any of the preceding embodiments, the optical network node wherein the burst mode is configured to work on a transmitter data phase and a clock recovery reference clock of the receiver.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 11 shows an example of an equalized output power process in coherent communication.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
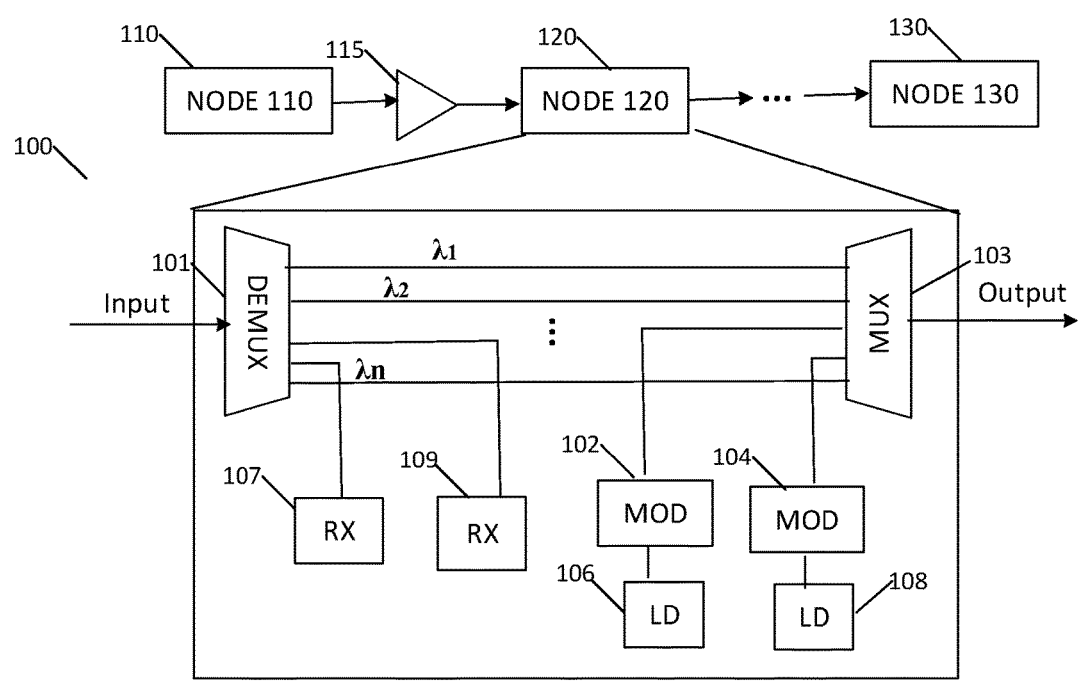
FIG. 1 is a schematic diagram of a conventional DWDM optical network system.

FIG. 1 is a schematic diagram of a conventional DWDM optical network system 100. The DWDM optical system 100 includes a plurality of nodes 110, 120, 130 with add/drop capability. Data signals are transmitted from a node to another. A DWDM optical signal transmitting and receiving portion is shown for the node 120 as an example. Optical signals at some wavelengths that carry data from other nodes are dropped into the receivers (RX) 107, 109 of the node 120; the receivers 107, 109 convert the optical signal to an electronic signal. CW optical waves from lasers 106, 108 are modulated at the modulators 102, 104 to carry the data from the node 120; the modulators 102, 104 may convert an electrical signal to an optical signal by changing the amplitude or phase or both of the amplitude and phase of the CW optical waves according to the electronic signal. After that the optical signals are multiplexed through the wavelength multiplexer 103 for transporting. An amplifier 115 is coupled between node 110 and node 120 to compensate for any node and fiber link losses. The system 100 requires transient in-line amplifier gain control, which may add complicated pre-scheduling or gain suppression for the network fast dynamic applications.

Figure 2:
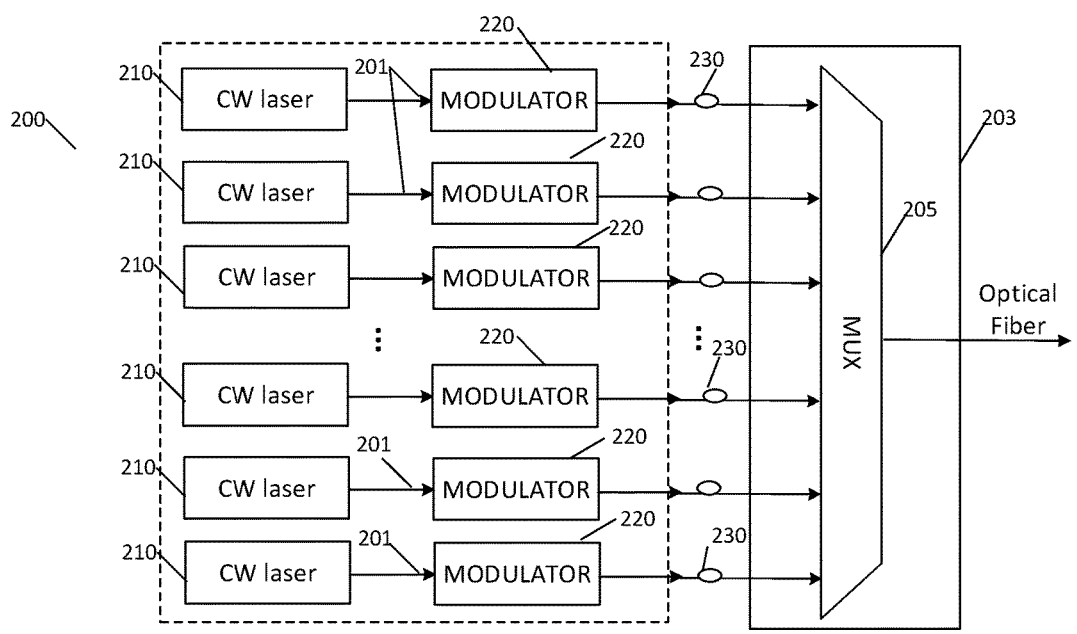
FIG. 2 is a schematic diagram of an example of DWDM optical signal transmitter in conventional DWDM optical network system.

FIG. 2 is a schematic diagram of an example of DWDM optical signal transmitter 200 in a conventional DWDM optical network system. The transmitter consists of an array of CW lasers 210 and modulatiors 220 coupled to an optical mux 205. The CW lasers 201 may be type of lasers which could be tuned to DWDM wavelengths. Each CW laser 201 is configured to transmit at a different wavelength. The optical modulator 220 may be a Mach-Zehnder modulator (MZM), an electro-absorption modulator (EAM), or lithium niobate modulator. Optical modulators 220 transfer electrical data signals to optical signals by modulating the amplitude and/or phase of the CW laser light.

For example, consider a DWDM optical system with 80 wavelength channels where the system 200 may be referred to as an 80-wavelength DWDM optical system. The system 200 comprises 80 CW lasers and 80 modulators for transmitting 80 different high-speed modulated optical signals. The system 200 with 80 wavelength channels used for fast dynamic application requires fast wavelength tuning in each node for transmission, which adds cost of tunable laser of the system. Packet switching is also slowed down due to guard time for laser tuning process. The system 200 with 80 wavelength channels requires fast input power dynamic range adaptation in each node for receiving, which adds cost of direct current (DC) cancellation loop (DCL) and automatic gain control (AGC) in each receiving node. As such, the system 200 constrains and limits the system application speed and cost.

DWDM optical communication systems carry multiple optical signal channels, each channel being assigned a different wavelength. Optical signal channels are generated and multiplexed to form an optical signal comprised of the individual optical signal channels, and transmitted over a single waveguide such as an optical fiber. The optical signal is subsequently demultiplexed such that each individual channel can be routed to a designated receiver.

In an embodiment, an optical bus configured for a dense wavelength-division multiplexing (DWDM) network, the optical bus comprises an optical source configured to generate a plurality of unmodulated optical signals each having a different wavelength; an optical multiplexer configured to multiplex the unmodulated optical signals to produce a combined, unmodulated optical signal, and to transmit the combined, unmodulated optical signal through an optical fiber; and a plurality of nodes connected in sequence to the output of the optical multiplexer.

Furthermore, each of the plurality of the nodes are not equipped with the optical source.

Furthermore, each of the plurality of the nodes is equipped with a plurality of optical receivers each detecting the optical signal after the wavelength of the optical signal is de-multiplexed and optical power of the optical signal is split.

Disclosed herein are various embodiments of a DWDM network that uses one centralized laser bank to optically power or optically source the entire network, allowing the network nodes to operate without costly lasers in each node. The laser bank may have one or more laser sources. The disclosed embodiments provide benefits such as simplicity, compactness, high scalability, high reliability, reduced system cost, lower power consumption, simple fiber management, and enabling building of fully intelligent optical networks. The disclosed embodiments are suitable for use in metropolitan networks covering distances from about a few kilometer (km) to about a few hundreds of km.

In an embodiment, a DWDM network comprises a headend node supplying a centralized DWDM optical source to a number of nodes logically arranged in a ring or line network. The number of nodes may be about 2 to about 20, for example. Unlike conventional optical networks employing DWDM system such as the system 100, no laser source is needed at the nodes. All nodes draw optical CW lights from the centralized source in the headend node, modulate the optical light, and send the modulated optical signal back into the network. Without having an optical source e.g. laser, at each node, the nodes may be built with large-scale integration, high yield, and low cost on silicon photonics platforms. In addition, all nodes may be identical, operating as white boxes without physical wavelength pre-assignments, which significantly simplifies network implementation and supply chain management. White boxes refer to the network nodes that do not include any wavelength-specific component. Further, each node may be dynamically configured to modulate and/or receive any wavelength of the centralized DWDM optical source. Thus, the disclosed embodiments allow for dynamic network reconfiguration without changing physical positions and/or connections of the nodes.

Figure 3:
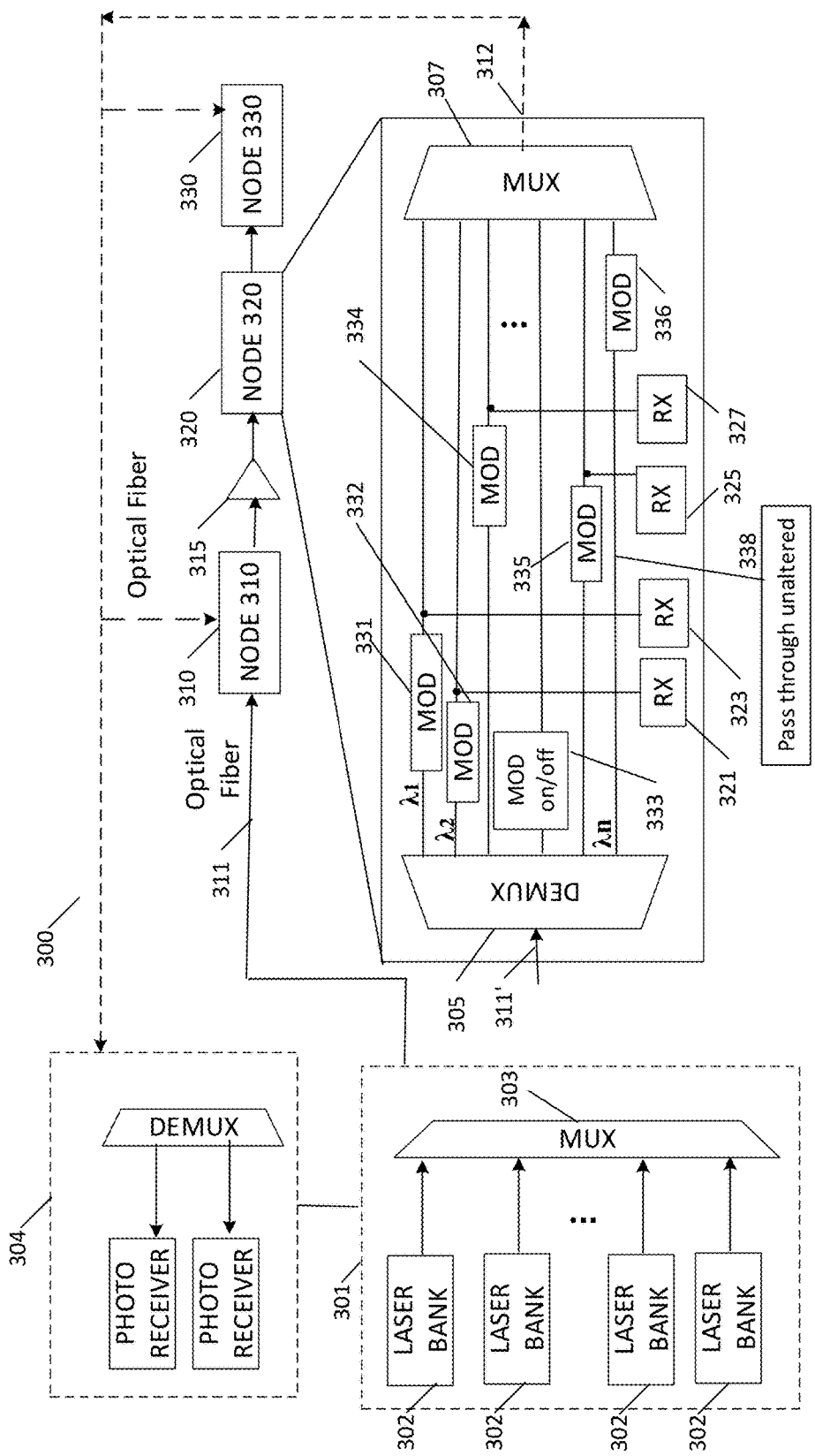
FIG. 3 is a schematic diagram of a DWDM optical network optically sourced by a centralized laser bank according to an embodiment of the disclosure.

FIG. 3 is a schematic diagram of a DWDM optical network optically sourced by a centralized laser bank according to an embodiment of the disclosure. The DWDM network 300 is formed by two or more optical fibers that sequentially connect all the nodes 310, 320, 330 in the network 300. DWDM network is multiplexed, de-multiplexed and launched bi-directionally. Receiver 304 of the node 301 is shown with de-multiplexer and photo receivers. For example, optical signals in a network of two optical fibers propagate in opposite directions. A CW optical source circuit pack 301 functions as a CW optical source for an array of DWDM wavelengths with a single optical output port. The CW optical source circuit pack 301 comprises one or more laser banks 302 which generate a plurality of optical signals for the network. Unlike the DWDM systems 100, 200, the laser bank 302 provides optical source power for the entire network 300 instead of having optical sources at individual nodes such as nodes 310, 320, 330. The laser bank 302 is configured to provide an array of DWDM wavelengths of interest in a CW mode to cover all DWDM wavelengths of interest in the network 300. The laser bank 302 may send optical signals comprising the array of DWDM wavelengths into network 300 via a single optical output port. A dashed line of optical fiber shows the combined signal is transmitted to all other nodes 310, 320, 330 of the plurality of nodes in sequence on the network simultaneously. One or more optical amplifiers 315 may be configured between two of the plurality of nodes 310, 320, 330 or between the CW optical source circuit pack 301 and a first of the plurality of nodes 310, 320, 330. Optical amplifiers may use a doped optical fibre as a gain medium to amplify an optical signal. They may be related to fibre lasers. The signal to be amplified and a pump laser are multiplexed into the doped fibre, and the signal is amplified through interaction with the doping ions. The most common example of optical amplifier is an Erbium Doped Fibre Amplifier (EDFA). The EDFA is an optical amplifier that uses a waveguide to boost an optical signal.

The DWDM network 300 with a centralized laser bank 302 may not require wavelength switching, dynamic range adaptation as well as transient control of optical amplifier. The basic network structure may be a DWDM bus powered by a DWDM laser bank at one end. Each node has full access to each wavelength for modulation and detection by chaining them as coupled to one or more same optical fibers in the network 300.

Each modulator modulators 331, 332, 333, 334, 335, 336, 338 of the one or more modulators may have a transmitting state and a bypassing state. A respective first wavelength channel of the wavelength channels may pass through at least two of the modulators modulators 331, 332, 333, 334, 335, 336, 338 and wherein the at least two of the modulators modulators 331, 332, 333, 334, 335, 336, 338 may be located in separate nodes of the plurality of nodes 320, 340 at one direction of the optical signals transmission in the network 300. Any one of the modulators 331, 332, 333, 334, 335, 336, 338 in the same node could be in a transmitting state to transmit data from the node to other nodes, or in a bypassing state to let other modulators 331, 332, 333, 334, 335, 336, 338 in the other nodes use the same wavelength for transmitting data from the other nodes. At any wavelength at one time, only one modulator in one node is allowed to be in transmitting mode. Thus, transient control of in-line amplifier might be avoided.

One or more optical amplifiers 315 may be configured between two of the plurality of nodes 310, 320, 330 or between a CW optical source circuit pack e.g. laser bank 301 and a first of the plurality of nodes 310, 320, 330. The most common example of optical amplifier is an Erbium Doped Fibre Amplifier (EDFA). The EDFA is an optical amplifier that uses a waveguide to boost an optical signal.

The plurality of nodes 310, 320, 330 may receive optical signals from a node that is connected sequentially or from any node that is connected in the network.

The architecture of the CW optical source circuit pack 300 provides several benefits. For example, a common wavelength locker may be used for all wavelengths instead of a separate wavelength locker at each node such as the nodes 310, 320, 330, and thus reduces cost. The wavelength locking precision may be high due to less variation from locker to locker. The integrated architecture allows for tight spacing, high reliability, and high scalability, where the numbers of lasers may be selected as needed. In addition, a common thermal-electric cooler (TEC) may be used for all wavelengths instead of a separate TEC at each node, and thus further reduces cost. In addition, the use of a common TEC lowers power consumption and achieves a higher efficiency. The major benefit is the sharing of a single source among multiple network nodes. Thus, the system cost may be greatly reduced.

The optical network node may be configured to carry out the methods as described above in various embodiments.

Optical light is a kind of electromagnetic wave, which may have four basic parameters e.g. amplitude, frequency, phase and state of polarization. State of polarization may also be called orientation of the electrical field. The state of polarization could rotate "randomly" during optical light transmission in optical fiber. A polarization aligner is configured to convert its random state at the input of the device to a certain constant state adapted to the requirement to go through the optical device. Constant state may be understood as an input optical power of an entity is kept at substantially a first level and an output optical power of the entity may also be kept at substantially a second level during operation of the entity.

Figure 4:
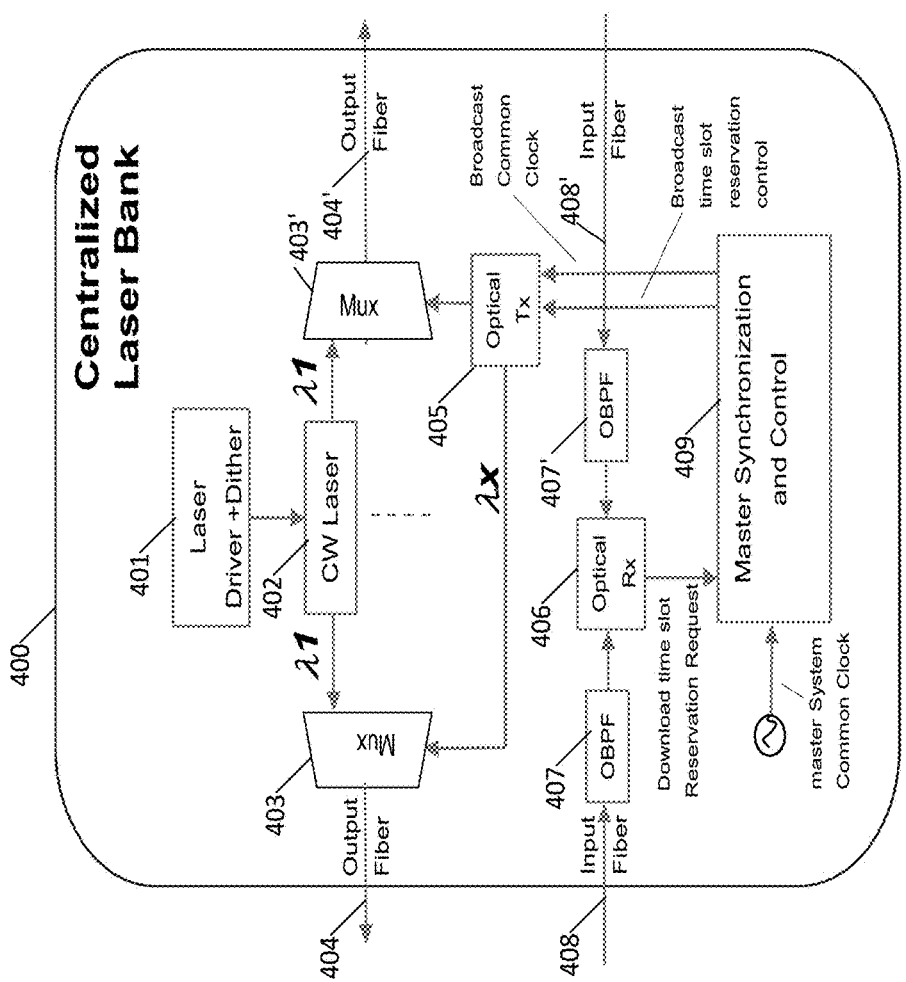
FIG. 4 depicts an example of a generic architecture of a centralized laser bank 400 with dynamic control features.

FIG. 4 depicts an example of a generic architecture of a centralized laser bank 400 with dynamic control features. A laser driver+dither unit 401 generates laser lights to CW laser 402. Laser lights $\lambda 1$ to $\lambda x$ from DWDM CW laser 402 are multiplexed in a MUX 403, 403' and launched bi-directionally.

The centralized laser bank 400 is configured to broadcast time slot reservation control to all nodes through a dedicated wavelength or a selected wavelength. A master common clock from a master synchronization and control unit 409 is also broadcasted through the dedicated wavelength to all nodes that connected to the centralized laser bank 400. The master synchronization and control unit 409 is configured to carry out time slot management for all nodes.

An optical bandpass filter (OBPF) 407, 407' which is coupled to an input fiber 408, 408', collects time slot reservation requests from all nodes connected to the centralized laser bank 400. An optical receiver receives the time slot reservation requests through the OBPF 407, 407', downloads the requests to the master synchronization and control unit 409. The time slot reservation control and the broadcast common clock may be sent from the master synchronization and control unit 409 to an optical transmitter 405, then to a MUX 403, 403' which are coupled to an output fiber, then sent out through the output fiber.

One or more time slot requests from all nodes are downloaded by the centralized laser bank 400. The master synchronization and control unit 409 is configured to re-send time slot management for all nodes when the network 300 needs so. Time slot management algorithm may be loaded or preconfigured with the master synchronization and control unit 409 according to management requirements of the network 300.

All nodes that are connected with the centralized laser bank 400 are locked to the broadcasted master common clock, which can greatly reduce jitter and wandering impact on clock recovery unit (CDR) re-locking process.

A burst mode is a fast dynamic traffic switching application through which data traffic may be fastly added and dropped on a modulator at transmitters and receivers. Being fast here may have the meaning that a traffic packet length could be as short as a few microseconds. Even the traffic turn on and turn off time could be less than one microsecond. A burst mode may be broadcasted to control signal and common clock from the centralized laser bank to lock system clock in all nodes. The broadcasted burst mode may work on both transmitter data phase and receiver CDR reference clock, which may results in common jitter and/or wander of data and clock at CDR, thus CDR re-locking can be expedited.

A burst mode may also be a generic electronics term referring to any situation in which a device is transmitting data repeatedly without going through all the steps required to transmit each piece of data in a separate transaction. The steps left out while performing a burst mode transaction may include for example: 1) waiting for input from another device; 2) waiting for an internal process to terminate before continuing the transfer of data; or 3) transmitting information which would be required for a complete transaction, but which is inherent in the use of burst mode.

A data-clock phase of the common clock may be pre-aligned through provisioning CDR voltage controlled oscillator (VCO) frequency and/or phase. The pre-alignment process may help expedite the re-locking of the arbitrary transmitter-receiver pair CDR.

Applying the architecture of FIG. 4 may have advantages as the follows. Since the centralized wavelength laser bank is configured for the network transmission, the wavelength assignment can be fixed, or can be carried out uniformly by a control node in the network, thus additional wavelength switching may not be needed for other nodes. The receive nodes in the network may enjoy a fixed receiving power, thus DCL and AGC can be saved. The nodes in the network may enjoy a fixed transmitting power, thus in-line amplifier may have a fixed gain without transient control.

Figure 5:
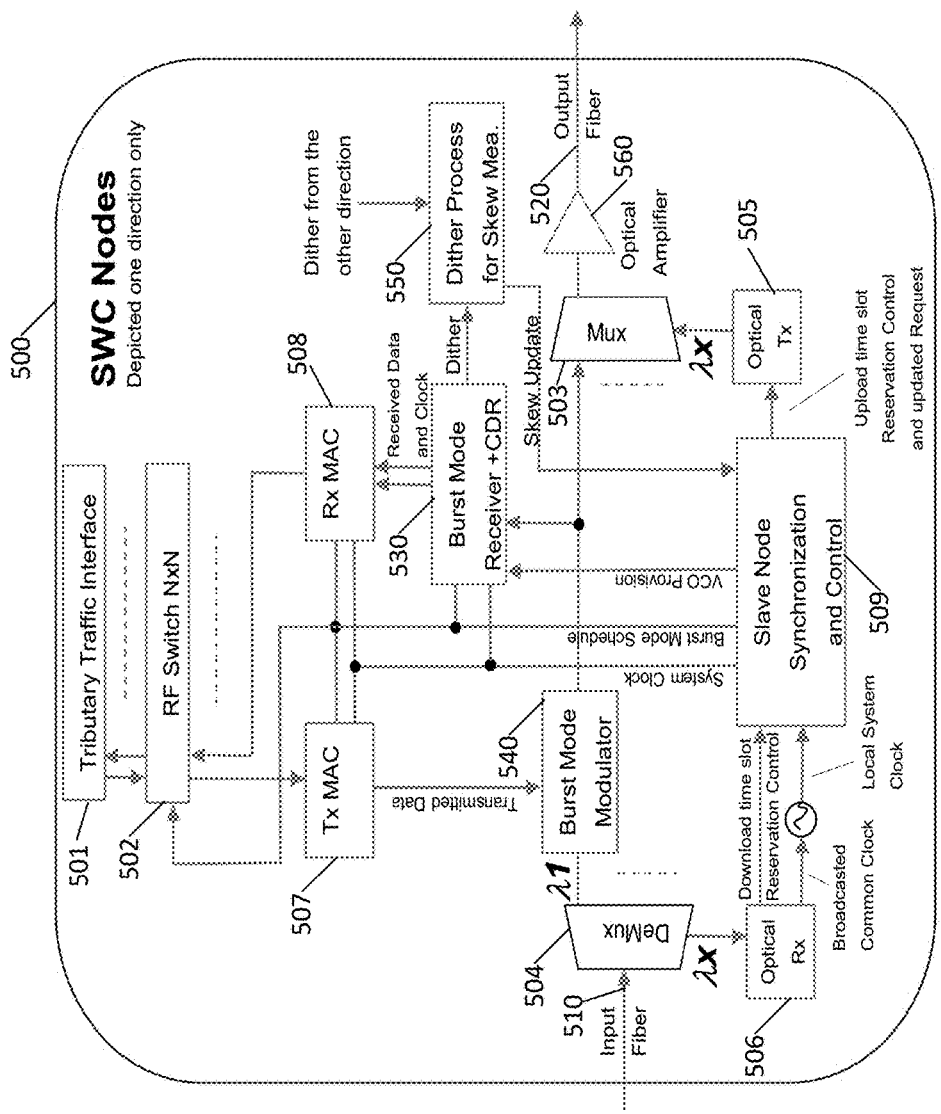
FIG. 5 depicts a generic architecture of the selectable wavelength connect (SWC) node.

FIG. 5 depicts a generic architecture of the selectable wavelength connect (SWC) node. The SWC node 500 may be configured with dynamic control features. The SWC node 500 may receive data from a tributary interface 501. The tributary interface 501 may be configured with transmitting and receiving media access, connected with a wavelength channel switch 502. The tributary traffic interface 501 may be steered to desired wavelength with Tx/Rx media access. A MUX 503 receives signals from a burst mode modulator 540 and from an optical TX 505 respectively, then from the MUX 503 the optical signal may be coupled to an optical amplifier 560, and is sent out through the output fiber 520. A DEMUX 504 receives signals from the burst mode modulator 540 and from an input fiber 510 respectively. An optical RX 506 receives optical signals from the DEMUX 504. Signals from the optical RX 506 may work as an input for a slave node synchronization and control unit 509, as well as a broadcasted common clock and a local system clock.

The SWC node receives time slot reservation control and common clock from the centralized laser bank 400 as described in FIG. 4. A time slot reservation control with new time slot request may be also received from the centralized laser bank 400. The slave node synchronization and control unit 509 is configured to distribute system clock to Tx/Rx MAC 507, 508 and burst mode receiver+CDR unit 530. The unit 530 is a receiver and alternatively with a clock recovery function that may control signals in a burst mode. The slave node sychronization and control unit 509 may distribute the burst mode time slot control to Tx/Rx MAC 507, 508, which may be done also based on measured Tx-Rx skew. The TX-RX skew will be discussed later.

A switch of Tx and Rx may be carried out to targeted traffic link. A CDR VCO pre-provision for Tx-Rx pair may be controlled by the SWC node 500. All Tx and Rx nodes may be locked to the broadcasted common clock from the centralized laser bank 400 can greatly reduce jitter and wandering impact on CDR re-locking process.

The Tx MAC 507 includes modulator driver and DC bias control; The Rx MAC 508 includes per photodiode-transimpedance amplifier-a clock recovery unit (PD-TIA-CDR) and its control.

By applying above mentioned archetectures of system 300, centralized laser bank 400, with SWC nodes 500 for the optical transmission systems, a re-locking of packet switching can be expedited, which could be even further expedited by Pre-provisioned Rx CDR to coarsely align initial clock phase to in-coming Tx data.

Figure 6:
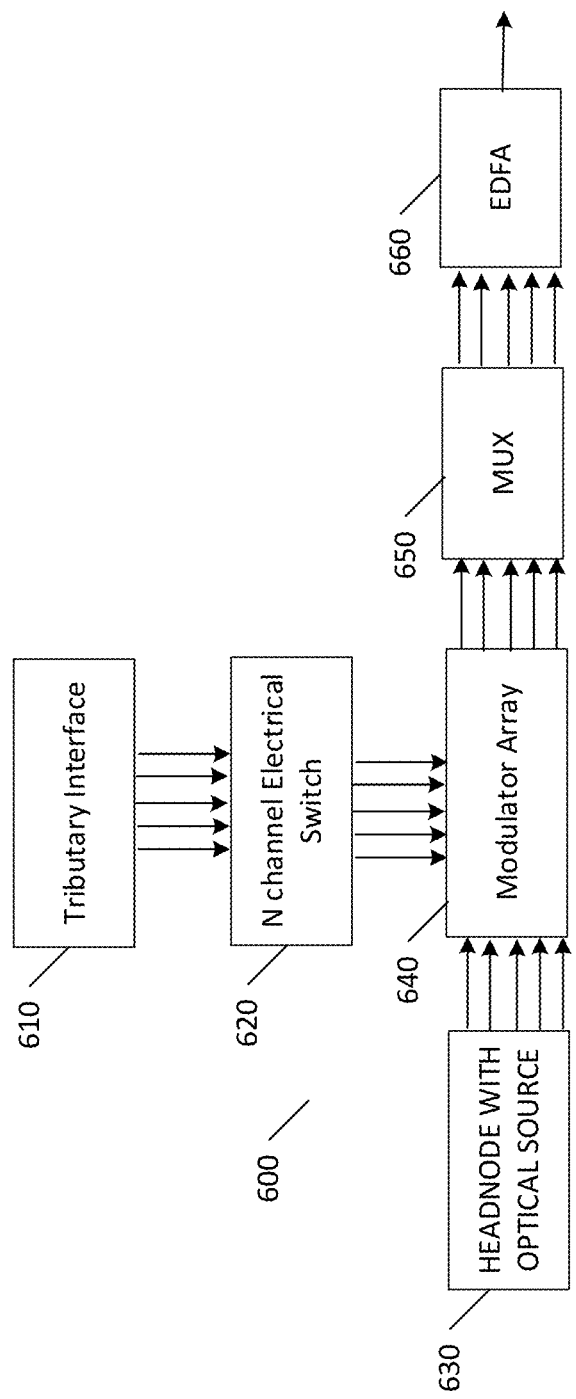
FIG. 6 is a schematic diagram illustrating a photonic processor according to an embodiment of the disclosure.

FIG. 6 is a schematic diagram illustrating a photonic processor according to an embodiment of the disclosure. The photonic processor 600 may be employed by the nodes in the network 300. The photonic processor 600 comprises an integrated N-channel electrical switch 620, which enables the provision of dynamic links to downstream nodes through different wavelengths. The photonic processor 600 comprises a tributary interface 610, the N-channel electrical switch 620, a modulator array 640, a MUX 650, and an optical amplifier here e.g. an ebrium-doped filter amplifier (EDFA) 660. The N-xhannel electrical switch 620 is positioned between the tributary interface 610 and the modulator array 640. The modulator array 640 is coupled to a DWDM laser bank 630 similar to the laser bank described in above embodiments and the CW optical source circuit pack 300. The MUX 650 is similar to the MUX described in above embodiments. The EDFA 660 is similar to the OAs 315 and 415 and is coupled to the MUX 650.

Tributary traffic I/O may be steered to desired wavelength with Tx/Rx media access.

The tributary interface 610 is configured to interface a plurality of client data interfaces. The modulator array 640 comprises a plurality of modulators similar to the optical modulators described in above embodiments. The N-Channel electrical switch 620 is also referred to as a cross connect. The N-channel electrical switch 620 is configured to control the activation of the modulators in the modulator array 640 and interconnects the client data interface to corresponding modulators, for example, based on network requests. Thus, the modulators in the modulator array 640 may modulate client data onto light generated by the DWDM laser bank 630 according to the configuration set by the N-channel electrical switch 620. The photonic processor 600 may further be integrated with RXs similar to RXs described in above embodiments.

The tributary traffic interface 610 may also apply here as the tributary interface 610 and vice versa, which connects with a plurality of controller interfaces, which includes modulator driver on transmitting side and receiving side.

Taking an example to describe how a modulator works, a modulator input optical power and a modulator output optical power will be first introduced below.

Figure 7:
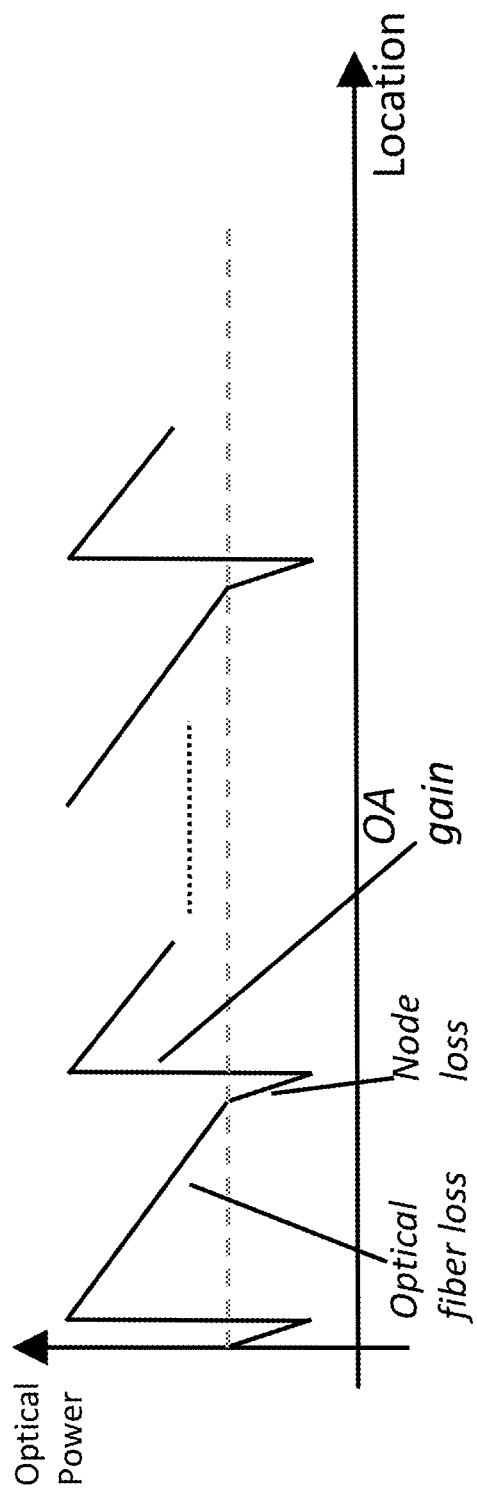
FIG. 7 illustrates power balancing in an optical transmission path.

FIG. 7 illustrates power balancing in an optical transmission path. Optical power drops along the optical fiber shows as an optical fiber loss, and through the nodes where node loss might occur. Receiving input power could be going down to top low e.g. to zero, which can result in long locking time after a dynamic switching. In order to keep stable optical transmission, an optical amplifier (OA) can be used to compensate loss of optical power during transmission, which may be called "OA gain".

Figure 8:
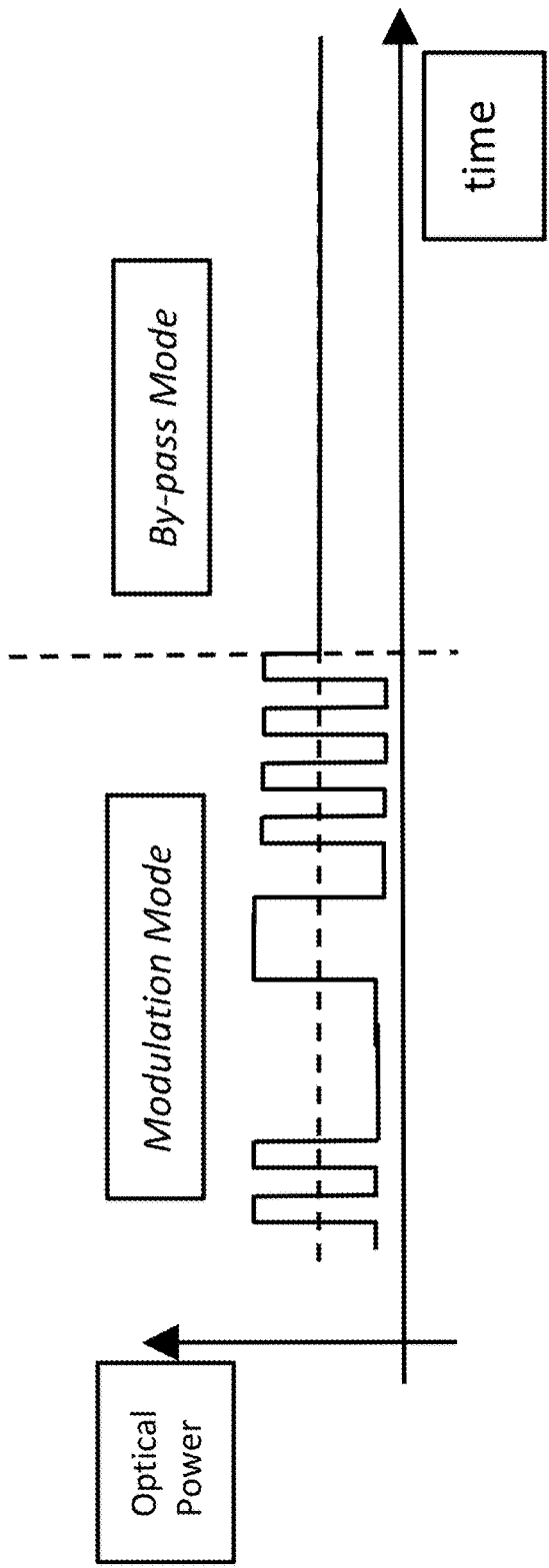
FIG. 8 illustrates a transmission example of optical power.

FIG. 8 illustrates a transmission example of optical power. At transmitting output, receiving input and OA input, average optical power is maintained constant over time. The meaning of "constant" is as described in above embodiments. Constant may have the meaning in the various embodiments that a value is kept substantially unchanged with respect to time change for a certain location of the communication network. An example of the optical power which is maintained constant is shown at a modulation mode, where the modulator may be called in a transmit state. An example of the optical power which is kept no change is shown at a by-pass mode, where the modulator may be called in a by-pass state. The states of a modulator may also be the states as described in above examples. e.g., in FIG. 3, FIG. 4.

Figure 9:
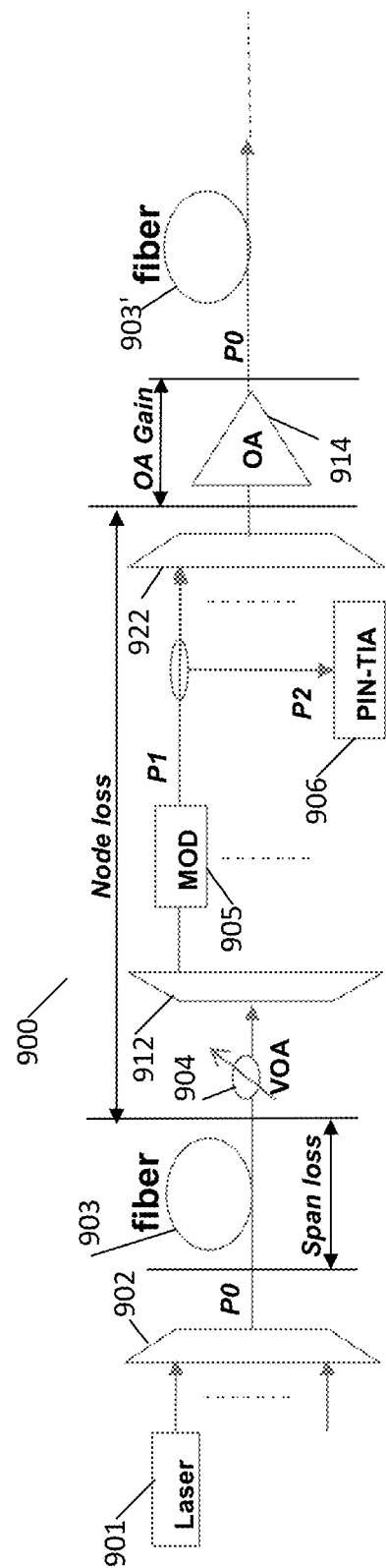
FIG. 9 shows Tx/Rx Power Balancing in Network.

FIG. 9 shows Tx/Rx Power Balancing in Network 900. An optical power is lanched from an optical source, e.g. a laser 901 into a transmitting fiber 903, 903'. The optical power per optical channel P0 from MUX 902 of each node is set to be constant, which may also be described as an input optical power of the optical channel is kept at substantially a first level and an output optical power of the optical channel is kept at substantially a second level during operation of the optical network. The optical power may be kept constant by tuning optical amplifier gain to fully compensate fiber link loss plus node element insertion loss. The loss during optical transmission is fully compensated by optical amplifier (OA) 914, periodically over span. Thus the compensation by OA which may be called "OA Gain" comparing to loss during the process of transmission, may be counted as equal to the amount accumulated by loss of nodes, and loss of span etc. For example, taking the amount of OA Gain=Node loss+Span loss.

The span loss may be determined by using an optical meter to measure true loss or by computing the loss of system components. The loss may be associated with span components, such as connectors, splices, patch panels, jumpers, and the optical safety margin. In the embodiment shows from FIG. 9, the span loss is calculated by the transmission distance between two nodes.

The node loss may be calculated by the loss in a node which is associated with components of the node, such as variable optical attenuators (VOA) 904, modulator 905, receiver 906, DEMUX 912, MUX 922.

Besides, modulator 905 output power P1 and receiver 906 input power P2 are set to be constant whether data modulation is turned on or off In the embodiment the receiver is a positive-intrinsic negative transimpedance amplifier (PIN-TIA) receiver 906. This may be achieved by biasing modulator DC at its quadrature phase of MZM. A type of on/off keying (OOK) modulator with fixed DC bias may be adopted. The type of OOK modulator may be either polarization insensitive or diversity type. Alternatively, a type of self-homodyne (SHD) modulator with polarization aligner might be adopted as an option for coherent application, as shown in FIG. 10.

Figure 10:
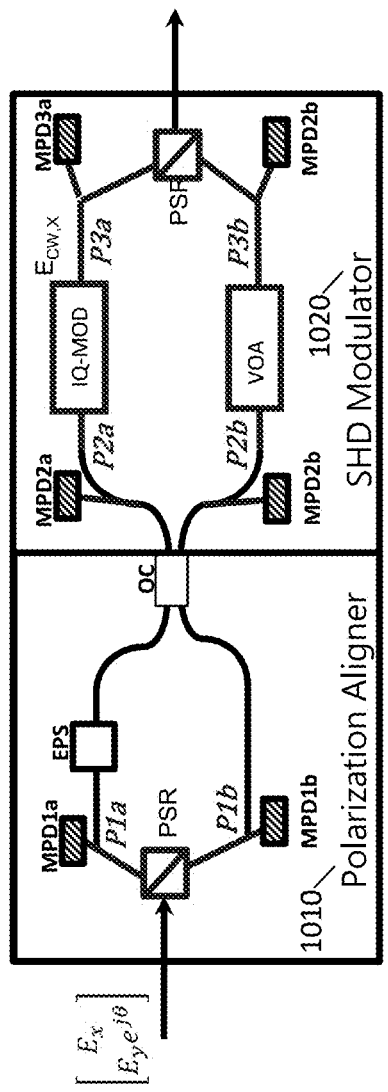
FIG. 10 shows Self Homodyne (SHD) transmitter with polarization aligner for coherent communication.

FIG. 10 shows Self Homodyne (SHD) transmitter with polarization aligner for coherent communication. An assumption associated with the disclosed centralized laser bank network architecture is the capability of arbitrary polarization tracking at each node. Polarization of light may rotate randomly in ordinary single-mode fiber (SMF), the input polarization state at each node may be a random combination of transverse electric (TE) and transverse magnetic (TM) modes. Since TE and TM modes behave differently in most photonic circuits, processing of both TE and TM modes in one circuit is possible but may be difficult. In the embodiment, a polarization aligner 1010 comprises a polarization splitter and rotator (PSR), monitoring photo detector (MPD)1a and MPD1b, endless phase shifter (EPS). Through an optical coupler (OC), the polarization aligner 1010 is connected to a SHD modulator 1020. The SHD modulator comprises an in-phase and quadrature modulator (IQ-MOD), a variable optical attenuator (VOA), and four MPDs such as MPD2a, MPD2b, MPD3a, and MPD3b. Through the PSR, the optical signal is transmitted from the SHD modulator. Since the laser lights propagate from centralized laser bank to SWC nodes mostly via a single mode fiber, the polarization state at the modulator input is random, in other words, not only is the magnitude ratio Ex/Ey of TE/TM reference to modulator input axis is changing, but so is the phase angle θ between TE/TM. The formula may be for example:

$$\frac{E_x}{E_y e^{j\theta}}$$

A receiver input power can be configured a wide range with adaptation by DC cancelling loop and AGC loop.

The Polarization aligner 1010 is configured to compensate arbitrary input polarization rotation, monitor each polarization power after polarization splitter-rotators (PSRs) per monitor photodiode-transimpedance amplifier-automatic gain controller (MPD-TIA-AGC), Equalize AGC outputs and feedback to control aligner phase shifter, and Lock aligner MZ phase to quadrature at arbitrary polarization state and ambient condition.

The operation example of IQ-MOD may be as follows. The polarization to the principle axis of the modulator may be aligned, and phase angle may be removed according to the following example as shown in FIG. 11.

FIG. 11 shows example formulas for use in an equalized output power process in coherent communication.

Incoming laser light is with arbitrary polarization state. Equalized input power P2a/b to IQ-MOD and VOA can be achieved by:

1) Monitor the optical power after PSR P1a, P1b per MPD-TIA-AGC to get equalized electrical signal feedback to EPS phase adjustment; and/or 2) Shift EPS phase φ to lock polarization aligner Mach-Zahnder interferometer (MZI) at quadrature phase regardless what phase θ between incoming TE/TM.

As a result, equalized input power P2a, P2b to IQ-MOD and VOA could be achieved, which can be proportional to the input total power. Self homodyne IQ-MOD can be configured at one polarization, and VOA at the other polarization. Fast VOA can be configured to keep total output power constant for both modulation state and by-pass state.

Figure 12:
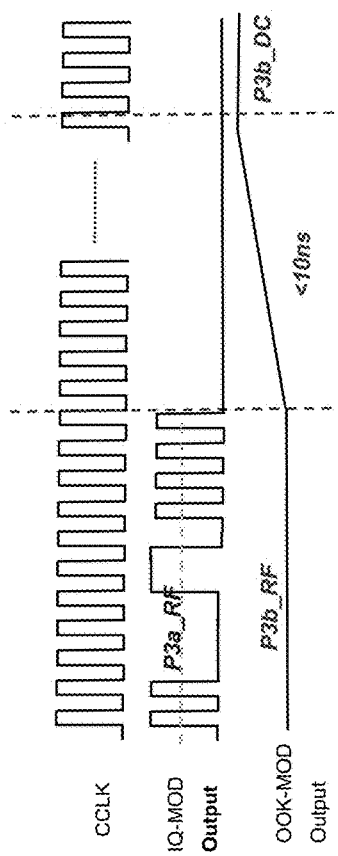
FIG. 12 shows Dynamic Application of Self Homodyne (SHD) Modulator.

Equalized output power P3a, P3b can be achieved with modulation on or off by the following process as an example:

1) IQ-MOD In-phase/Quadrature/Parent MZ locked to null/null/quad constantly, no matter what modulation state (output power P3a_RF) or bypass state (output power ~0)
2) Set VOA attenuation for desired CW output power P3b_RF at modulation state
3) Re-set VOA attenuation to CW output power P3b_DC at bypass state
4) VOA re-setting time should be only a few nanoseconds FIG. 12 shows dynamic application of Self Homodyne (SHD) Modulator 1020.

Figure 13:
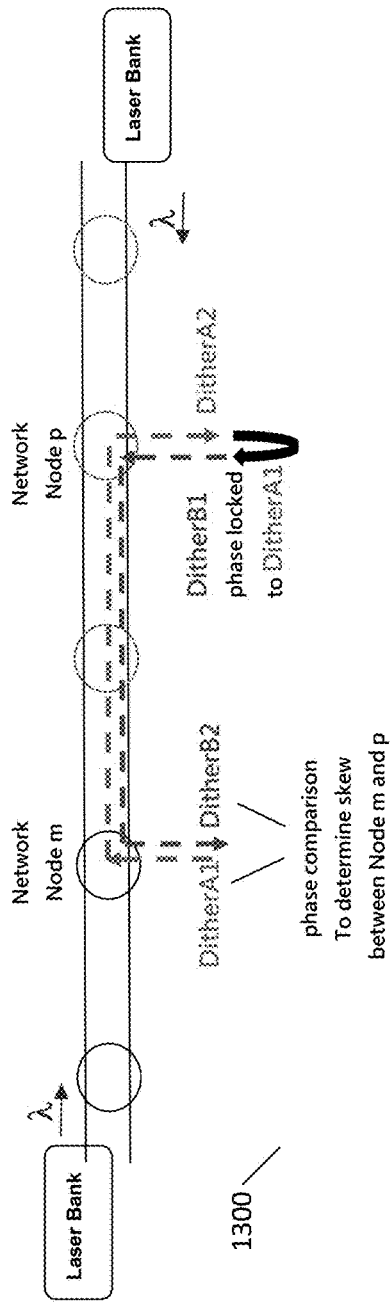
FIG. 13 illustrates a Tx-Rx Skew Measurement example.

FIG. 13 illustrates a Tx-Rx Skew Measurement example 1300. The laser bank as the CW lasers having been described above e.g. in FIG. 4 can be added with low frequency dither for skew measurement. Tx-Rx pair skew for any wavelength could be easily measured by sending and detecting round-trip low frequency tone between any Tx-Rx pair and for any wavelength. To keep a dynamic traffic allocation among arbitrary Tx-Rx pair, path delay or skew among them may have to be pre-calibrated precisely for each wavelength. If 1 kHz dither is used, skew over 80 km fiber is about ~400 us, within one period of dither signal. The calibration process may be as follows:
1) DitherA1 sent from network node m, DitherA2 detected at Np
2) DitherB1 sent from network node p and phase locked to DitherA2
3) DitherB2 detected at network node m and phase compared to DitherA1
4) Half of delay between DitherB2 and DitherA1 is the skew for node pair Nm-Np A Slave Node Synchronization and Control Unit as described above in FIG. 5 (SWC nodes) may be configured to Switching Tx/Rx to target traffic link based on the measured Tx-Rx skew.

Another advantage of the disclosed centralized laser bank network architecture when compared to traditional DWDM network such as the systems 100, 200 is that the disclosed network architecture (e.g., the networks 300, 400) eliminates a large number of lasers such as the CW lasers which are otherwise required by each node in the systems 100, 200 to implement wavelength switch capabilities. For an example, a network with N wavelengths and M nodes, the saving may be about 2×N×(M−1) lasers. If N=40 and M=6, the network requires about 400 lasers.

One assumption associated with the disclosed centralized laser bank network architecture is the capability of arbitrary polarization tracking at each node. Polarization of light may rotate randomly in ordinary single-mode fiber (SMF), the input polarization state at each node may be a random combination of transverse electric (TE) and transverse magnetic (TM) modes. Since TE and TM modes behave differently in most photonic circuits, processing of both TE and TM modes in one circuit may be difficult.

Figure 14:
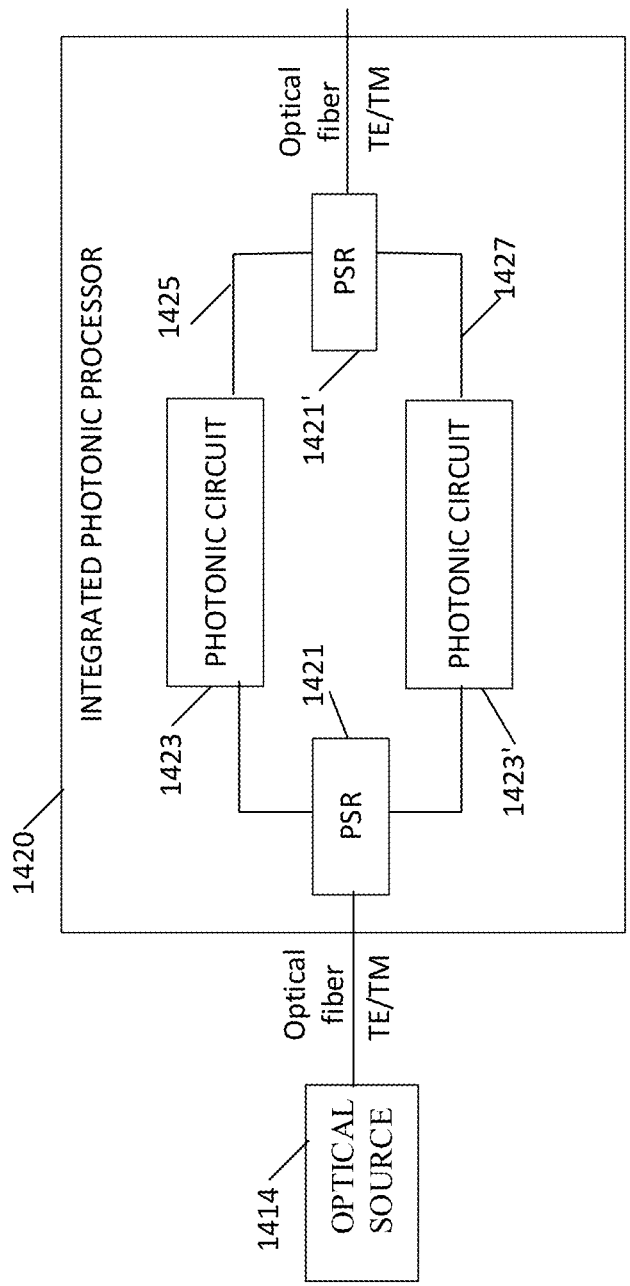
FIG. 14 illustrates a polarization diversity approach according to an embodiment of the disclosure.

FIG. 14 illustrates a polarization diversity approach according to an embodiment of the disclosure. The approach 1400 may be employed by the nodes in systems 300, 400 when processing light signals. In the approach 1400, an integrated photonic processor 1420 comprises two waveguides positioned between two polarization splitter-rotators (PSRs) 1421 and 1421'. Each of the waveguides 1425, 1427 is coupled to an identical photonic circuit 1423 and 1423', which may correspond to a transmitter, a modulator such as the modulators in systems 300, 400 as described in above embodiments, or a RX such as the RX's in systems 300, 400. As described in above embodiments. The PSR 1421 is coupled to a CW optical source 1414 similar to the CW laser 302 and 401, which may be part of a laser bank or the CW optical source circuit pack 301. The PSR 1421 receives an incoming light signal comprising TE and TM modes from the CW source 1414. The PSR 1421 splits the light signal into two portions and rotate the two portions into the same polarization mode, for example, the TE mode. The PSR 1421 passes one portion to the waveguide and the other portion to the waveguide 1425. Each photonic circuit 1423, 1423' processes one of the light portions. After processing, the processed light from one of the waveguides 1425 and 1427 is rotated back to the orthogonal polarization, for example, the TM mode. The PSR 1421, 1421' combined the outputs of the waveguides 1425 and 1427 such that no coherent interference is present between the two outputs.

Figure 15:
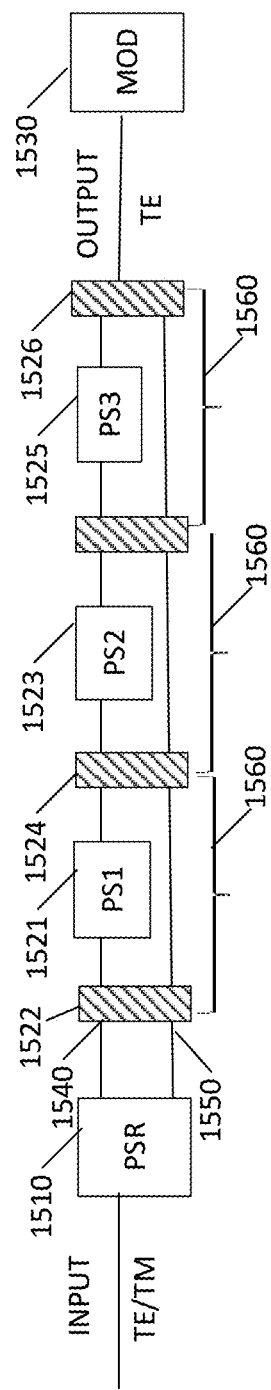
FIG. 15 illustrates a polarization diversity approach according to another embodiment of the disclosure.

FIG. 15 illustrates a polarization diversity approach according to another embodiment of the disclosure. The approach 1500 may be employed by the nodes in the networks described above 300, 400 when processing light signals from a network. The approach 1500 may not require to have two copies of the same photonic circuit. The approach 1500 comprises a PSR 1510, a plurality of couplers 1522, 1524, 1526, a plurality of phase shifters (PSs) 1521, 1523, 1525, and two waveguides 1540 and 1550. The PSR 1510 is similar to the PSRs in FIG. 10. The waveguides 1540 and 1550, the couplers 1522, 1524, 1526 and the PSs 1521, 1523, 1525, form multiple stages of Mach-Zehnder interferometers (MZIs) 1560. The PSs 1521, 1523, 1525 are configured to phase-shift the light signal propagating along the waveguide 1540, 1550. The PSR 1510 splits an incoming light signal comprising a combination of TE and TM modes, for example, received from an input fiber, into two portions and rotates the two portions into the same polarization. The PSR 1510 passes one portion to the waveguide 1540 and another portion to the waveguide 1550. The light signals of the waveguides 1540 and 1550 are coherently combined into one output signal. However, the two polarization Eigen modes, TE and TM, in the input fiber have random amplitude and phase relationships between them. Thus, the MZIs 1560 are configured such that light signals propagating along the two waveguides 1540 and 1550 constructively interfered with each other with a minimal loss when the light signals are combined. The PSs 1521, 1523, 1525 actively adjusts phase delays between the two waveguides 1540 and 1550 to track the time evolution of the polarization state in the input fiber. The approach 1500 may not need to have two copies of the same photonic circuit as in the approach 1400. Thus, the approach 1500 may save even more power and area and reduce complexity.

Figure 16:
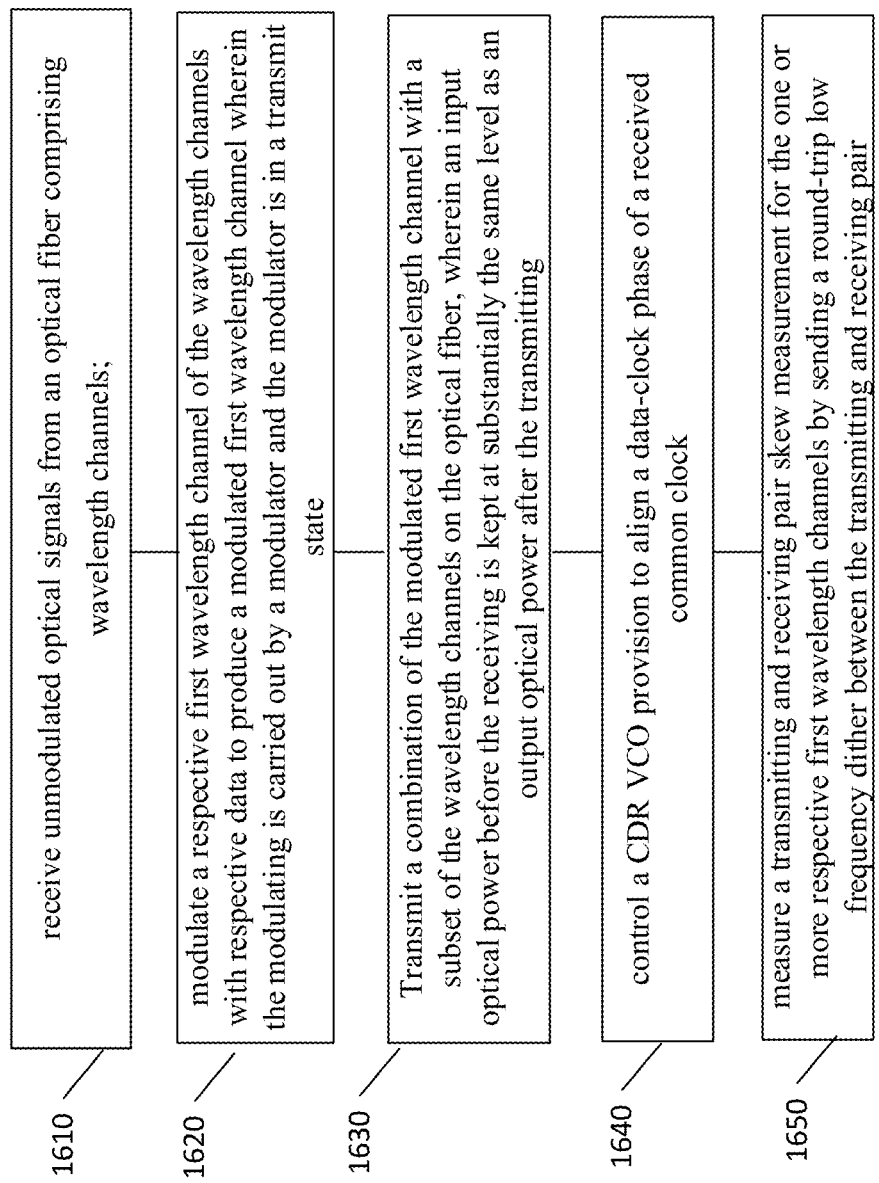
FIG. 16 shows a flowchart of a method of transmission in a DWDM network according to an embodiment of the disclosure.

FIG. 16 shows a flowchart of a method for operating an optical network for dense wavelength-division multiplexing (DWDM) communication according to an embodiment of the disclosure. Various embodiments of the method may be carried out in network system 300 as described above. At step 1610 the method may comprise optical network node receiving unmodulated optical signals from an optical fiber comprising wavelength channels; at step 1620, modulating a respective first wavelength channel of the wavelength channels with respective data to produce a modulated first wavelength channel wherein the modulating is carried out by a modulator and the modulator is in a transmit state; and at step 1630, transmitting a combination of the modulated first wavelength channel with a subset of the wavelength channels on the optical fiber.

Optionally, the method may further comprise that an input optical power before the modulating is kept at substantially a first level, and an output optical power after the modulating may also be kept at substantially a second level.

Optionally, the method may further comprise that a first optical network node is connected in sequence to the optical fiber with one or more other optical network nodes in the optical network, wherein a plurality of modulators are configured to carry out the modulating, wherein the plurality of modulators are configured such that only one modulator can be in a transmit state at any given time and the other modulators are in a bypass state at the given time whereby the other modulators do not modulate their respective first wavelength channels.

Optionally, the method may further comprise at step 1640, controlling a CDR VCO provision to align a data-clock phase of a received common clock.

Optionally, the method may further comprise at step 1650, measuring a transmitting and receiving pair skew measurement for the one or more respective first wavelength channels by sending a round-trip low frequency dither between the transmitting and receiving pair.

Figure 17:
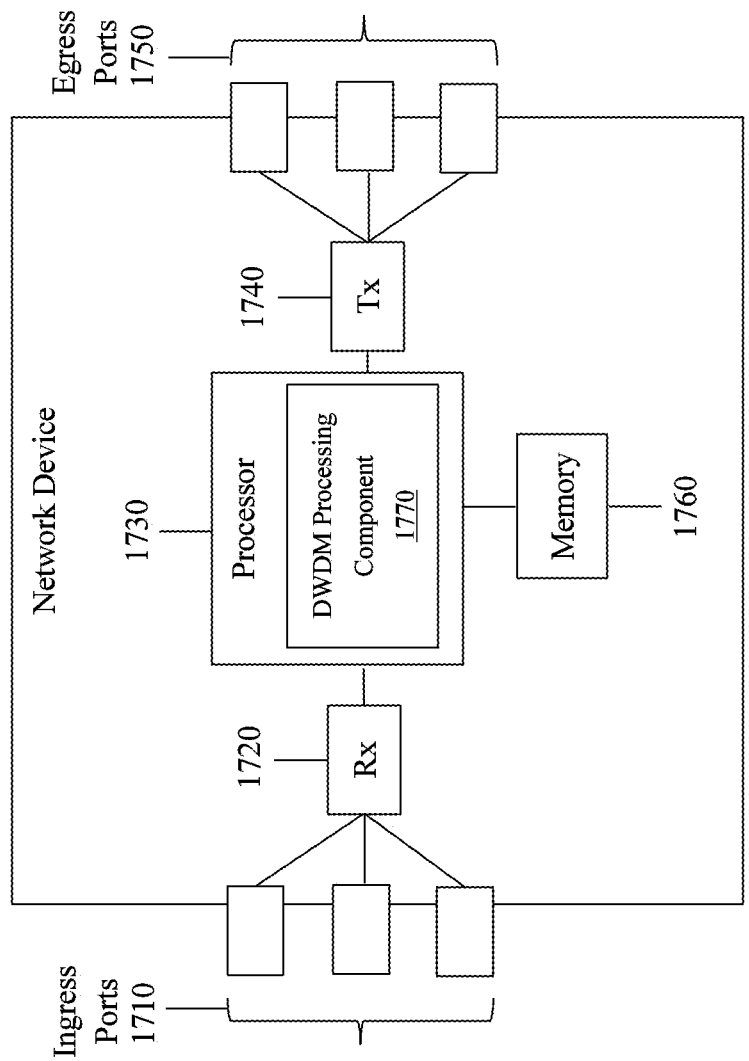
FIG. 17 is a schematic diagram of a network device according to an embodiment of the disclosure.

FIG. 17 is a schematic diagram of a network device according to an embodiment of the disclosure. The device 1700 is suitable for implementing any of the disclosed embodiments described above. The device 1700 may function as a headend node such as the headend node in network 300, or an optical network node 310, 320, 330, 400, 500 a laser bank such as the laser bank 400 and the CW optical source circuit pack 301 in a DWDM network. The device 1700 comprises ingress ports 1710 and receiver units (Rx) 1720 for receiving data; a processor, logic unit, or central processing unit (CPU) 1730 to process the data; transmitter units (Tx) 1740 and egress ports 1750 for transmitting the data; and a memory 1760 for storing the data. The device 1700 may also comprise optical-to-electrical (OE) components and electrical-to-optical (EO) components coupled to the ingress ports 1710, the receiver units 1720, the transmitter units 1740, and the egress ports 1750 for egress or ingress of optical or electrical signals.

The processor 1730 is implemented by any suitable combination of hardware, middleware, firmware, and software. The processor 1730 may be implemented as one or more CPU chips, cores (e.g., as a multi-core processor), field-programmable gate arrays (FPGAs), application specific integrated circuits (ASICs), and digital signal processors. The processor 1730 is in communication with the ingress ports 1710, receiver units 1720, transmitter units 1740, egress ports 1750, and memory 1760. The processor 1730 comprises a DWDM processing component 1770. The DWDM processing component 1770 implements the various disclosed embodiments described above. The inclusion of the DWDM processing component 1770 therefore provides a substantial improvement to the functionality of the network and effects a transformation of the network to a different state. Alternatively, the DWDM processing component 1770 is implemented as instructions stored in the memory 1760 and executed by the processor 1730. The processor 1730 may have a transmitting state and a bypassing state. A respective first wavelength channel of the wavelength channels may pass through at the bypassing state with the optical signal unaltered. A respective first wavelength channel of the wavelength channels may be modulated with data at the transmitting state.

The memory 1760 comprises one or more disks, tape drives, and solid-state drives and may be used as an overflow data storage device, to store programs when such programs are selected for execution, and to store instructions and data that are read during program execution. The memory 1760 may be volatile and non-volatile and may be read-only memory (ROM), random-access memory (RAM), ternary content-addressable memory (TCAM), and static random-access memory (SRAM).

The memory 1760 comprises computer-readable non-transitory media. The computer-readable non-transitory media includes all types of computer readable media, including magnetic storage media, optical storage media, flash media and solid state storage media.

It should be understood that software can be installed in and sold with the network device 1400. Alternatively the software can be obtained and loaded into the network device 1400, including obtaining the software through physical medium or distribution system, including, for example, from a server owned by the software creator or from a server not owned but used by the software creator. The software can be stored on a server for distribution over the Internet, for example.

The use of the term "about" means a range including ±10% of the subsequent number, unless otherwise stated. While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An optical network node connected in sequence to an optical fiber of an optical network for dense wavelength-division multiplexing (DWDM) communication, the optical network node comprising:
    an optical input port configured to receive unmodulated optical signals from the optical fiber comprising wavelength channels;
    one or more modulators coupled to the optical input port wherein each modulator of the one or more modulators has a transmit state and a bypass state, wherein the one or more modulators are each configured to modulate a respective first wavelength channel of the wavelength channels with respective data to produce a modulated first wavelength channel when the modulator is in the transmit state;
    one or more receivers coupled to the optical input port through an optical power splitter wherein each receiver is configured to receive a respective portion of optical power of one of the respective first wavelength channels of the wavelength channels; and
    an optical output port configured to transmit a combination of the one or more of the modulated first wavelength channels with a subset of the wavelength channels on the optical fiber;
    wherein an input optical power of the each modulator is kept at substantially a first level and an output optical power of the each modulator is kept at substantially a second level during operation of the each modulator.

2. The optical network node of claim 1, wherein the optical network node comprises one or more transmitters coupled to the optical output port, and an input optical power of each of the transmitters is kept at substantially a first level and an output optical power of the transmitter is kept at substantially a second level during operation of the transmitter.

3. The optical network node of claim 1, wherein the input optical power of the each modulator is kept at the substantially the first level and the output optical power of the each modulator is kept at substantially the second level during operation of the each modulator by tuning an optical amplifier gain to a full compensate link loss of the DWDM communication.

4. The optical network node of claim 3, wherein the tuning the optical amplifier is processed without transient control.

5. The optical network node of claim 1, wherein the one or more modulators are configured such that only one modulator of the one or more modulators is in the transmit state at a given time and the other modulators are in the bypass state at the given time whereby the other modulators of the one or more modulators do not modulate their respective first wavelength channels.

6. The optical network node of claim 1, wherein the optical network node is further configured to control a clock recovery unit (CDR) voltage controlled oscillator (VCO) provision to align a data-clock phase of a common clock that the optical network node receives from another optical network node.

7. The optical network node of claim 6, wherein the other optical network node is a centralized optical network node.

8. The optical network node of claim 6, wherein the common clock is distributed by a centralized optical network node.

9. The optical network node of claim 1, wherein the optical network node further comprises one or more transmitters, wherein the optical network node is configured to:
transmit, using one of the transmitters, a first low frequency dither to another network node;
receive, by one of the receivers, a second low frequency dither from the other network node in response to the first low frequency dither; and
determine a skew based on a delay between transmission of the first dither and receipt of the second dither.

10. The optical network node of claim 1, wherein the optical network node further configured to receive a common clock for a burst mode application.

11. The optical network node of claim 1, wherein the one or more modulators comprise a type of self-homodyne (SHD) modulator with a polarization aligner.

12. The optical network node of claim 1, wherein the respective portion of optical power of the respective first wavelength channels that is received by the one or more receivers is kept at a substantially same level.

13. The optical network node of claim 1, wherein the one or more modulators comprise a type of on/off keying (OOK) modulator.

14. The optical network node of claim 13, wherein the OOK modulator is configured with a fixed DC bias.

15. The optical network node of claim 13, wherein the OOK modulator is a type of polarization intensive.

16. The optical network node of claim 13, wherein the OOK modulator is a type of diversity.

17. A method for operating an optical network node for dense wavelength-division multiplexing (DWDM) communication, the method comprising:
receiving unmodulated optical signals from an optical fiber comprising wavelength channels;
modulating a respective first wavelength channel of the wavelength channels with respective data to produce a modulated first wavelength channel wherein the modulating is carried out by a modulator of the optical network node and the modulator that is in a transmit state, wherein the modulator has a transmit state and a bypass state; and
transmitting a combination of the modulated first wavelength channel with a subset of the wavelength channels on the optical fiber;
wherein an input optical power of the modulator is kept at substantially a first level and an output optical power of the modulator is kept at substantially a second level during operation of the modulator.

18. The method of claim 17, wherein the input optical power of a receiver of the optical network node before the modulating is kept at substantially the first level and the output optical power of the modulator is kept at substantially the second level after the modulating by tuning an optical amplifier gain to a full compensate link loss of the DWDM communication.

19. The method of claim 18, wherein the tuning the optical amplifier is processed without transient control.

20. The method of claim 17, wherein the optical network node is connected in sequence to the optical fiber with one or more other optical network nodes in the optical network, wherein a plurality of modulators of the optical network node are configured to carry out the modulating, wherein the plurality of modulators are configured such that only one modulator is in a transmit state at a given time and the other modulators are in a bypass state at the given time whereby the other modulators do not modulate their respective input wavelength channels.

21. The method of claim 17, further comprising:
controlling a clock recovery unit (CDR) voltage controlled oscillator (VCO) provision to align a data-clock phase of a received common clock.

22. The method of claim 17, wherein the optical network node further comprises one or more transmitters performing the transmitting and one or more receivers performing the receiving, the method further comprising:
transmitting, using one of the transmitters, a first low frequency dither to another network node;
receiving, by one of the receivers, a second low frequency dither from the other network node in response to the first low frequency dither; and
determining a skew based on a delay between transmission of the first dither and receipt of the second dither.

23. The method of claim 17, wherein the optical network node further configured to receive a common clock for a burst mode application.

24. The method of claim 17, wherein the received optical signals are kept at substantially same level.

25. An optical network node connected in sequence to an optical fiber of an optical network for dense wavelength-division multiplexing (DWDM) communication, comprising:
a memory storing instructions; and
one or more processors in communication with the memory, wherein the instructions, when executed by the one or more processors, cause the one or more processors to receive unmodulated optical signals from the optical fiber comprising wavelength channels;
modulate, by a modulator, a respective first wavelength channel of the wavelength channels with respective data to produce a modulated first wavelength channel in a transmit state of the modulator, wherein the modulator has a transmit state and a bypass state; and
transmit a combination of the modulated first wavelength channel with a subset of the wavelength channels on the optical fiber;
wherein an input optical power of the modulator is kept at substantially a first level and an output optical power of the modulator is kept at substantially a second level during operation of the modulator.

26. The optical network node of claim 25, wherein the input optical power to the optical network node before the modulating is kept at substantially the first level and the output optical power of the optical network node is kept at substantially the second level after the modulating by tuning an optical amplifier gain to a full compensate link loss of the DWDM communication.

27. The optical network node of claim 26, wherein the tuning the optical amplifier is processed without transient control.

28. The optical network node of claim 25, wherein the optical network node is connected in sequence to the optical fiber with one or more other optical network nodes in the optical network, wherein a plurality of modulators are configured to carry out the modulating, wherein the plurality of modulators are configured such that only one modulator is in a transmit state at a given time and the other modulators are in a bypass state at the given time whereby the other modulators do not modulate their respective first wavelength channels.

29. The optical network node of claim 25, wherein the processor is further configured to perform operations to:
measure a transmitting and receiving pair skew measurement for the one or more respective first wavelength channels by sending a round-trip low frequency dither between the transmitting and receiving pair.

30. The optical network node of claim 25, wherein the optical network node further configured to receive a common clock for a burst mode application.

31. The optical network node of claim 25, wherein the received optical signals are kept at substantially same level.

* * * * *